United States Patent
Li et al.

(10) Patent No.: US 11,628,557 B2
(45) Date of Patent: Apr. 18, 2023

(54) FORCE APPLYING AUXILIARY DEVICE AND CONTROL METHOD THEREOF

(71) Applicant: Wistron Corporation, New Taipei (TW)

(72) Inventors: Min-Yen Li, New Taipei (TW); Tsung-Yin Tsou, New Taipei (TW); Hsiang-Min Chan, New Taipei (TW); Ke-Yu Lan, New Taipei (TW)

(73) Assignee: Wistron Corporation, New Taipei (TW)

( * ) Notice: Subject to any disclaimer, the term of this patent is extended or adjusted under 35 U.S.C. 154(b) by 229 days.

(21) Appl. No.: 16/894,897

(22) Filed: Jun. 8, 2020

(65) Prior Publication Data

US 2021/0299853 A1 Sep. 30, 2021

(30) Foreign Application Priority Data

Mar. 30, 2020 (TW) .................................. 109110770

(51) Int. Cl.
*B25J 9/00* (2006.01)
*B25J 9/16* (2006.01)
(Continued)

(52) U.S. Cl.
CPC ............... *B25J 9/0006* (2013.01); *B25J 9/14* (2013.01); *B25J 9/161* (2013.01); *B25J 9/1633* (2013.01); *B25J 9/1674* (2013.01); *B25J 13/088* (2013.01)

(58) Field of Classification Search
CPC ... B25J 9/0006; B25J 9/14; B25J 9/161; B25J 9/1633; B25J 9/1674; B25J 13/088;
(Continued)

(56) References Cited

U.S. PATENT DOCUMENTS 10,596,013 B2  3/2020 Seo
2010/0010639 A1\* 1/2010 Ikeuchi .................. B25J 9/0006
                                                                 623/24
(Continued)

FOREIGN PATENT DOCUMENTS

CN    106361544    2/2017
CN    107837173    3/2018

OTHER PUBLICATIONS

"Office Action of Taiwan Counterpart Application", dated Sep. 18, 2020, p. 1-10.

(Continued)

*Primary Examiner* — Abby Y Lin
*Assistant Examiner* — Dylan M Katz
(74) *Attorney, Agent, or Firm* — JCIPRNET

(57) ABSTRACT

A force applying auxiliary device and a control method thereof are provided. The force applying auxiliary device includes a sensor group, a processor, and a force applying driver. The sensor group includes a first sensor disposed on a first side and a second sensor disposed on a second side. The processor collects motion posture data of a user according to the first sensor and the second sensor, and determines whether a motion of the user is abnormal. When determining that the motion of the user is abnormal, the processor selects at least one preset abnormal pattern as a specific abnormal pattern according to the motion posture data, and controls the force applying driver to provide a force by using the specific abnormal pattern. A force difference between first and second forces applied to first and second side feet is adjusted based on a difference in sampling values between the sensors.

6 Claims, 4 Drawing Sheets

(51) Int. Cl.
*B25J 9/14* (2006.01)
*B25J 13/08* (2006.01)

(58) Field of Classification Search
CPC ...... B25J 13/087; B25J 13/085; B25J 11/002; G05B 2219/40305; A61H 3/00; A61H 2003/005; A61H 2003/007; A61H 2230/625

See application file for complete search history.

(56) References Cited

U.S. PATENT DOCUMENTS

| | | |
|---|---|---|
| 2016/0101515 A1 | 4/2016 | Lim et al. |
| 2017/0020765 A1 | 1/2017 | Lim et al. |
| 2018/0078390 A1 | 3/2018 | Seo |
| 2018/0092536 A1* | 4/2018 | Sandler ................. G08C 17/02 |
| 2018/0177436 A1* | 6/2018 | Chang ................... A61B 5/1117 |
| 2018/0235831 A1* | 8/2018 | Jang ..................... B62D 57/032 |
| 2019/0336383 A1* | 11/2019 | Song ..................... A61H 1/024 |
| 2019/0365592 A1* | 12/2019 | Norton ................... A61H 3/04 |
| 2021/0177687 A1* | 6/2021 | Lamson ................. A61H 1/00 |
| 2021/0244599 A1* | 8/2021 | Arzanpour ............... A61H 3/00 |

OTHER PUBLICATIONS

"Office Action of Taiwan Counterpart Application", dated Nov. 9, 2022, p. 1-9.

* cited by examiner

FORCE APPLYING AUXILIARY DEVICE AND CONTROL METHOD THEREOF

CROSS-REFERENCE TO RELATED APPLICATION

This application claims the priority benefit of Taiwan application serial no. 109110770, filed on Mar. 30, 2020. The entirety of the above-mentioned patent application is hereby incorporated by reference herein and made a part of this specification.

BACKGROUND

Technical Field

The disclosure relates to a force applying auxiliary technique, and particularly relates to a force applying auxiliary device and a control method thereof.

Description of Related Art

A power-assisted force applying auxiliary device (which is also known as a powered suit, a powered armor, a powered exoskeleton, an exoskeleton robot, etc.) that assists a user to walk is designed to protect the user and maintain normal motions of the user. The force applying auxiliary device may be used as a prosthesis to assist an elder to walk. The force applying auxiliary device is usually installed on a leg of the user to assist the user in walking, squatting, standing, etc.

For the convenience of use, the force applying auxiliary device is equipped with a variety of sensors to detect motions of the user, and provides a corresponding pushing force or support force according to a specific motion of the user. However, when the motion of the user is not conformed to a designed preset motion, the force applying auxiliary device may have an abnormal behavior or an unsmooth operation. Therefore, how to make the force applying auxiliary device to automatically provide corresponding force applying assistance through the sensors according to different situations and behaviors of the user is one of the directions that need to be researched and developed in the design of the force applying auxiliary device.

SUMMARY

The invention is directed to a force applying auxiliary device and a control method thereof, which are capable of determining whether a motion of a user is unbalanced (for example, a walking posture is biased to one side or left-right imbalance) and automatically adjusting magnitudes of forces applied by the force applying auxiliary device on both sides, such that the user is capable of gradually recovering normal motions through the force applying auxiliary device, and feeling more support and assistance from the force applying auxiliary device on corresponding motions.

The invention provides a force applying auxiliary device including a sensor group, a processor, and a force applying driver. The sensor group includes at least one first sensor and at least one second sensor. The at least one first sensor is disposed on a first side of the force applying auxiliary device. The at least one second sensor is disposed on a second side of the force applying auxiliary device. The processor is coupled to the sensor group. The force applying driver is controlled by the processor. The processor collects motion posture data of a user according to the at least one first sensor and the at least one second sensor, and determines whether a motion of the user is unbalanced according to the motion posture data. When determining that the motion of the user is unbalanced, the processor selects at least one of a plurality of preset abnormal patterns as a specific abnormal pattern according to the motion posture data, and controls the force applying driver to provide a force by using the specific abnormal pattern. A force difference between a first force applied to a first side foot of the user and a second force applied to a second side foot of the user is adjusted based on a difference between sampling values of the at least one first sensor and the at least one second sensor.

The invention provides a control method of a force applying auxiliary device, the force applying auxiliary device includes a sensor group. The sensor group includes at least one first sensor disposed on a first side of the force applying auxiliary device and at least one second sensor disposed on a second side of the force applying auxiliary device. The control method includes following steps. Motion posture data of a user is collected according to the at least one first sensor and the at least one second sensor. It is determined whether a motion of the user is unbalanced. When it is determined that the motion of the user is unbalanced, at least one of a plurality of preset abnormal patterns is selected as a specific abnormal pattern according to the motion posture data in response to determining that the motion of the user is unbalanced. Moreover, a force applying driver is controlled to provide a force by using the specific abnormal pattern. A force difference between a first force applied to a first side foot of the user and a second force applied to a second side foot of the user is adjusted based on a difference between sampling values of the at least one first sensor and the at least one second sensor.

Based on the above description, the force applying auxiliary device and the control method thereof in the embodiments of the invention may collect the motion posture data of the user through sensors located at different sides, so as to determine whether the motion of the user is abnormal, for example, left and right asymmetry of a walking posture, a situation that the user holds a heavy object on one side, etc., and automatically adjust magnitudes of the forces applied to the two sides by the force applying auxiliary device according to a difference of sampling data of the sensors on the two sides, such that the user may gradually recover a normal motion (for example, postures such as normal walking, squatting, standing, etc.) from motion abnormity through the force applying auxiliary device. In this way, when the user suddenly slows down on one side of footstep during a motion, or it is detected that the user is walking with a heavy object in hand or is performing motions such as standing up, squatting down, etc., a magnitude of the force applied by the force applying driver is adjusted according to a weight of the detected heavy object instead of applying a fixed force, so that the user feels more support and assistance from the force applying auxiliary device on corresponding motions. Moreover, abnormal motion data of the user may be recorded in a database to serve as a reference for subsequent determination of motions of the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
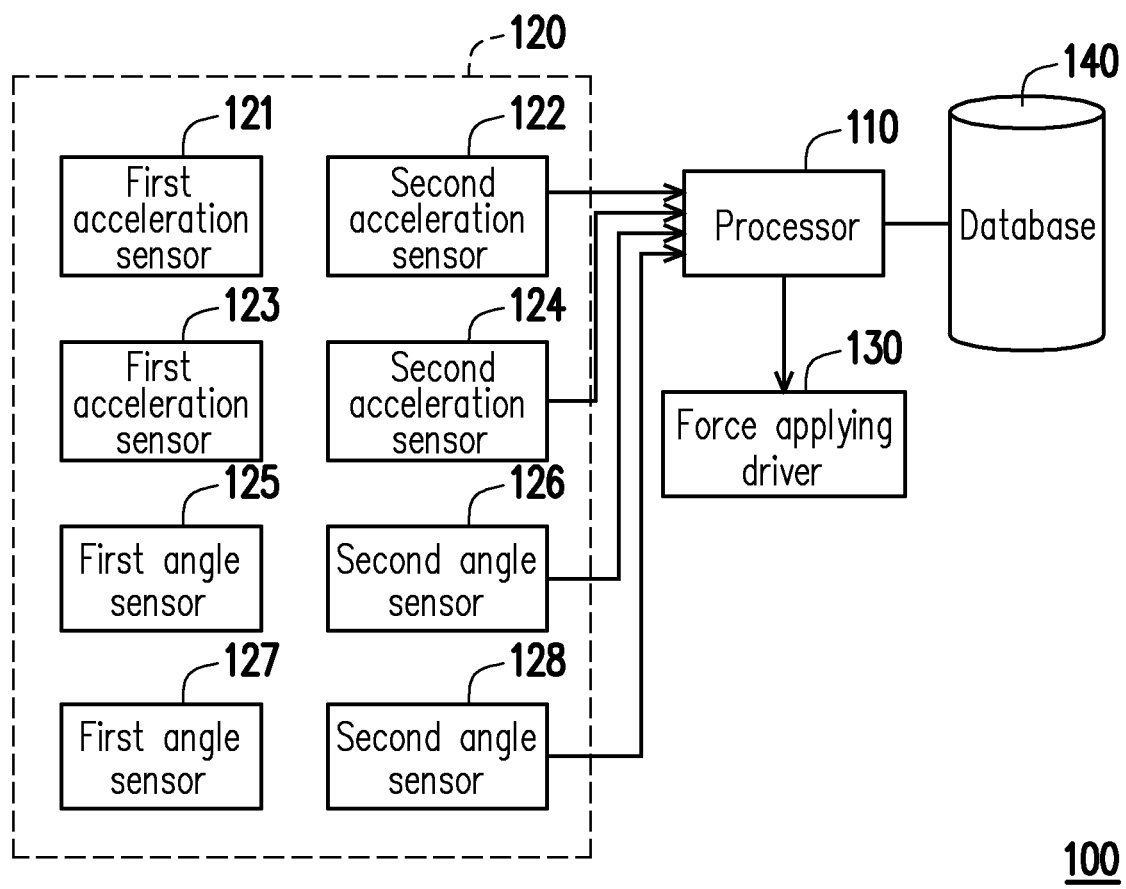
FIG. 1 is a schematic diagram of a force applying auxiliary device according to an embodiment of the invention.

A force applying auxiliary device may detect a preset motion of a user by using sensors, and increase a force such as a pushing force or support force by a corresponding preset value to assist the user in walking, squatting, or standing. However, such force applying auxiliary device may only provide a force of a fixed value when determining that the user performs the preset motion. When the user performs a non-preset motion (for example, a walking posture is biased to one side, one-sided weight-bearing, difficulty in walking with one foot, or left-right imbalance), the force applying auxiliary device may not be able to interpret the motion of the user and may not provide a corresponding force, which results in failure to achieve a force applying auxiliary function. Even more, when the user has an emergency, such as a fall, the force applying auxiliary device probably may not be able to provide corresponding assistance due to that the preset motions do not include the above motion.

Even if the force applying auxiliary device detects that a motion or posture of the user is the preset motion, the motion or posture of the user may be slightly different from the preset motion due to that the user lifts or carries a heavy object, and the force applying auxiliary device thus makes an error judgment and does not provide a corresponding force. Alternatively, since the force provided by the force applying auxiliary device has a fixed value, the user cannot obtain a greater force for assistance when performing the corresponding motion, which results in a fact that the function of force applying auxiliary is not obvious.

The force applying auxiliary device of the embodiment of the invention determines whether a motion of the user is a preset motion according to sampling information of the sensors, and also determines whether two legs of the user stand or walk in balance according to a data difference between the sensors located on two sides of the force applying auxiliary device. Moreover, when it is determined that the two legs of the user do not stand or walk in balance, the force applying auxiliary device may adaptively enhance a force applied to one side, such that the motion of the user (such as walking, squatting, standing, etc.) gradually returns to the normal preset motion. Therefore, the force applying auxiliary device of the embodiment may also detect whether the motion of the user is abnormal (i.e., whether motions of the feet on both sides are balanced), and when it is determined that the motion of the user is unbalanced, the difference in sampling data between the sensors located on both sides of the user is used to automatically strengthen the force applied to one side of the foot, so as to achieve a function of adjusting the motion of the user. On the other hand, in the embodiment of the invention, the sampling data determined as motion abnormity of the user is also sorted into abnormal posture samples, and the abnormal posture samples are stored in a database, which may be used to accelerate a time in subsequent determination of whether a motion of the user is normal or abnormal, such that the force applying auxiliary device may react more quickly to provide force assistance, thereby avoiding abnormal motion of the user. For example, when the user frequently experiences abnormal motions such as falls or sudden leg weakness, etc., the force applying auxiliary device may quickly provide support, and the user may gradually recover normal motions through the force applying auxiliary device. In this way, the user may feel more support and assistance from the force applying auxiliary device on corresponding motions.

On the other hand, the force applying auxiliary device of the embodiment of the invention may only use acceleration sensors and angle sensors to determine whether the motion of the user is unbalanced (for example, a walking posture is biased to one side, one-sided weight-bearing, difficulty in walking with one foot, or left-right imbalance) without using other types of sensors to perform auxiliary detection. In this way, it is possible to automatically adjust magnitudes of forces applied to both sides of the user by the force applying auxiliary device without using diversified and expensive sensors, and the user may gradually recover normal motions through the force applying auxiliary device. A plurality of embodiments are provided below to support the invention.

Figure 2:
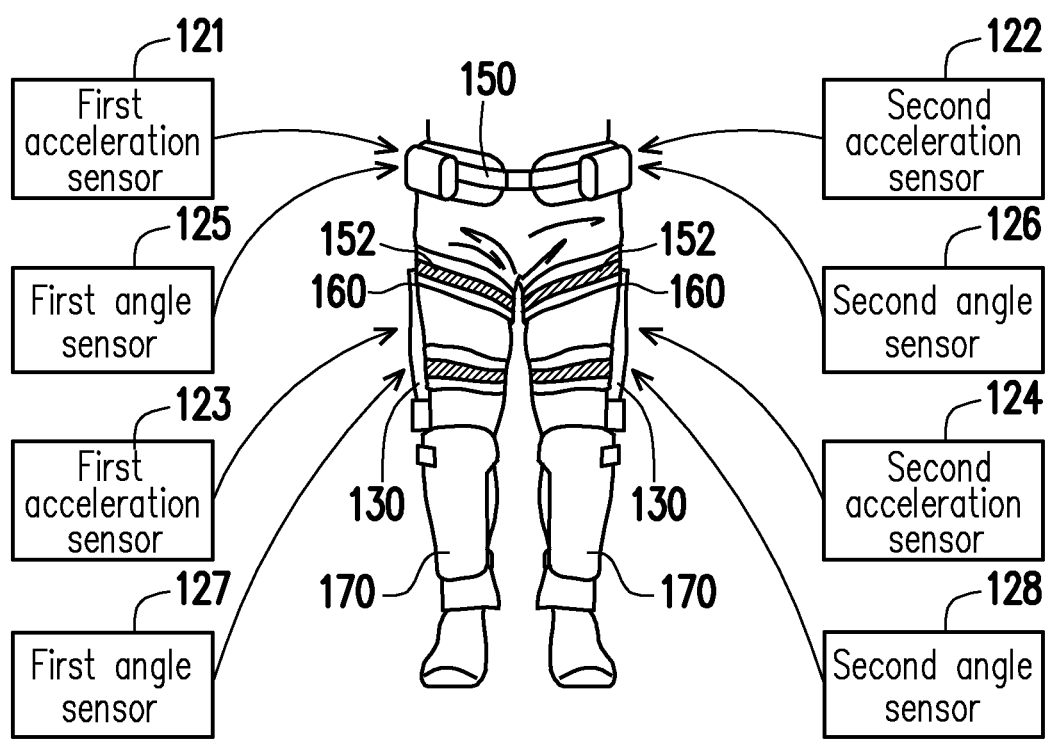
FIG. 2 is a functional block diagram of a force applying auxiliary device according to an embodiment of the invention.

FIG. 1 is a schematic diagram of a force applying auxiliary device 100 according to an embodiment of the invention. FIG. 2 is a functional block diagram of the force applying auxiliary device 100 according to an embodiment of the invention. Referring to FIG. 1 and FIG. 2, in the embodiment of the invention, an exoskeleton robot for lower limbs is used as an example of the force applying auxiliary device 100, so as to assist a user who is inconvenient in movement to move and walk more conveniently. Those applying the embodiment may use different types of exoskeleton robots or similar products (for example, exoskeleton robots for upper limbs) according to their needs to implement the embodiments of the invention. The force applying auxiliary device 100 is not limited to human use, but may also be used on animals to serve as an auxiliary device in walking or force applying. The force applying auxiliary device 100 mainly includes a processor 110, a sensor group 120 and a force applying driver 130. The force applying auxiliary device 100 may further include a database 140.

The processor 110 is coupled to the sensor group 120. The processor 110 of the embodiment may be a central processing unit (CPU), a microcontroller (MCU), a special-purpose processor, or other components with the same functions and a computing function.

The sensor group 120 includes a plurality of sensors used for sensing motions of the user, and the sensors include at least one first sensor disposed on a first side (for example, a right side) of the force applying auxiliary device 100 and at least one second sensor disposed on a second side (for example, a left side) of the force applying auxiliary device 100. The first side is opposite to the second side, i.e., the first side and the second side are better to be located on the left side and the right side of the user, respectively. The sensor group 120 of the embodiment includes a plurality of acceleration sensors 121-124 and a plurality of angle sensors 125-128. In detail, the force applying auxiliary device 100 mainly detects motions of hip joints and knee joints of the user, so as to determine a movement status and trend of the legs of the user. Therefore, in the embodiment, the acceleration sensors 121-124 and the angle sensors 125-128 are respectively disposed at the left and right hip joints and the left and right knee joints of the user, so as to determine the motion of the user according to the various sensors in the sensor group 120. The acceleration sensors 121-124 may detect acceleration changes at positions where the acceleration sensors are located (for example, the left and right hip joints or the left and right knee joints), for example, a sudden pitch, roll or yaw. The angle sensors 125-128 may detect angle changes of the feet at positions where the angle sensors are located (for example, the left and right hip joints or the left and right knee joints). For example, the first acceleration sensor 121 and the first angle sensor 125 are provided at the right hip joint, the second acceleration sensor 122 and the second angle sensor 126 are provided at the left hip joint, the first acceleration sensor 123 and the first angle sensor 127 are provided at the right knee joint, and the second acceleration sensor 124 and the second angle sensor 128 are provided at the left knee joint. The first acceleration sensors 121 and 123 and the first angle sensors 125 and 127 may also be referred to as first sensors, and the second acceleration sensors 122 and 124 and the second angle sensors 126 and 128 may also be referred to as second sensors.

The force applying driver 130 is controlled by the processor 110. The force applying driver 130 may be a motor, and driving modes of the motor may include motor driving, hydraulic driving, artificial muscle driving, pneumatic driving, etc. The driving mode of the force applying driver 130 for applying force is not limited by the invention. The force applying driver 130 of the embodiment controls a magnitude of an applied force through a current. The force applying driver 130 is mainly provided at the knee joints of both sides of the user, so that the user may obtain an auxiliary force through the force applying driver 130 during a motion. Namely, the force applying driver 130 includes a first knee motor on the first side and a second knee motor on the second side. The "applied force" of the embodiment may be a foot lifting force between a thigh and a calf on the same side of the user or a support force between the thigh and the calf, which may be defined by those applying the embodiment according to an actual need as long as it is a force provided by the force applying driver 130 to the foot of the user at the same side.

Moreover, the force applying auxiliary device 100 may further include at least one strap 152, an exoskeleton frame 160, and at least one protector 170 in structure. The straps 152 may be disposed near a waist, groins and the knee joints of the user. The exoskeleton frames 160 may be implanted on the thighs of both sides of the user to serve as a support of a rigid structure. The protectors 170 may be respectively provided on the calves of both sides of the user to protect the user from injury caused by falling. Those applying the embodiment may adjust the numbers and placing positions of the straps 152, the exoskeleton frames 160 and the protectors 170 according to actual needs.

Figure 3:
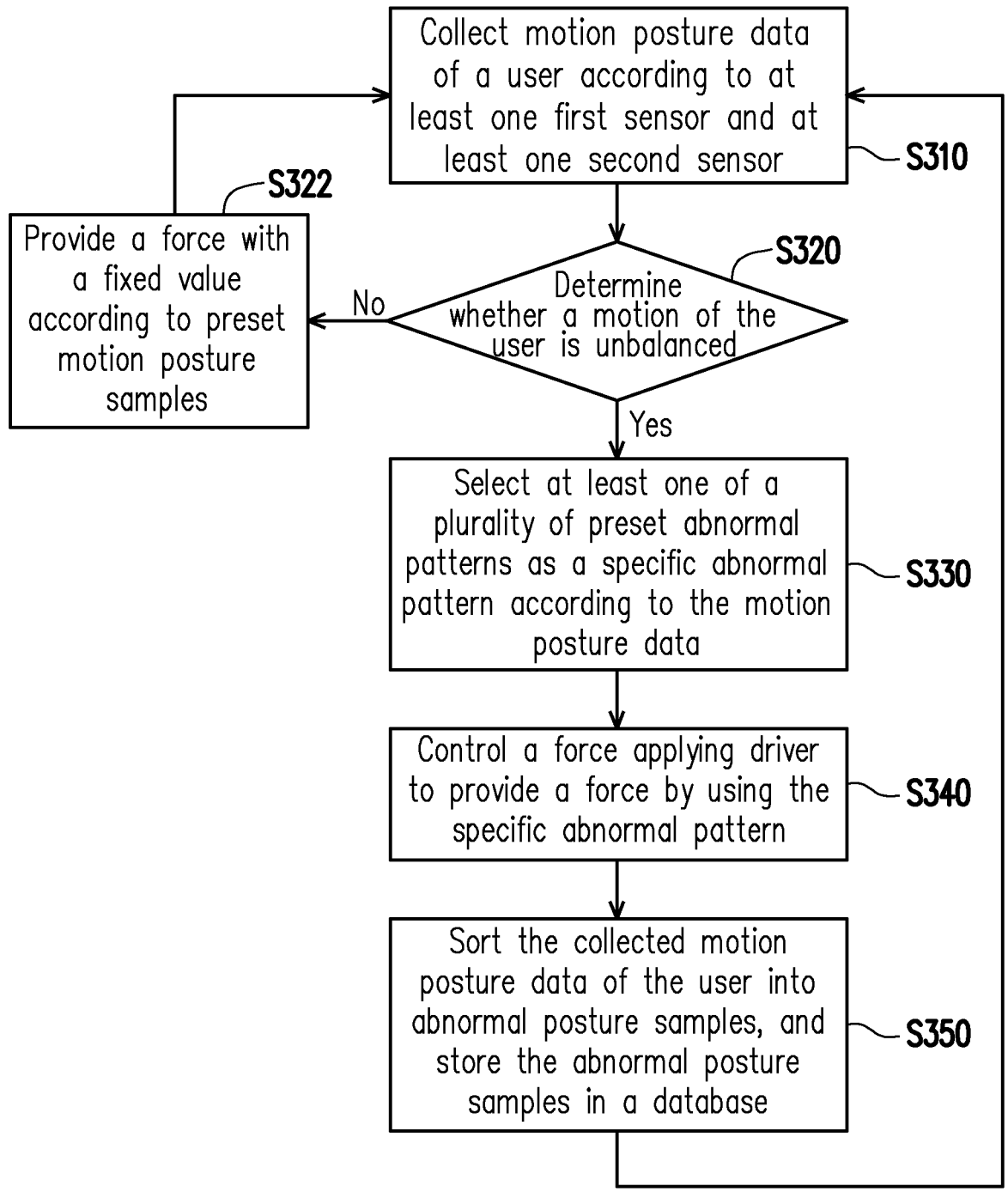
FIG. 3 is a flowchart illustrating a control method of a force applying auxiliary device according to an embodiment of the invention.
Figure 4:
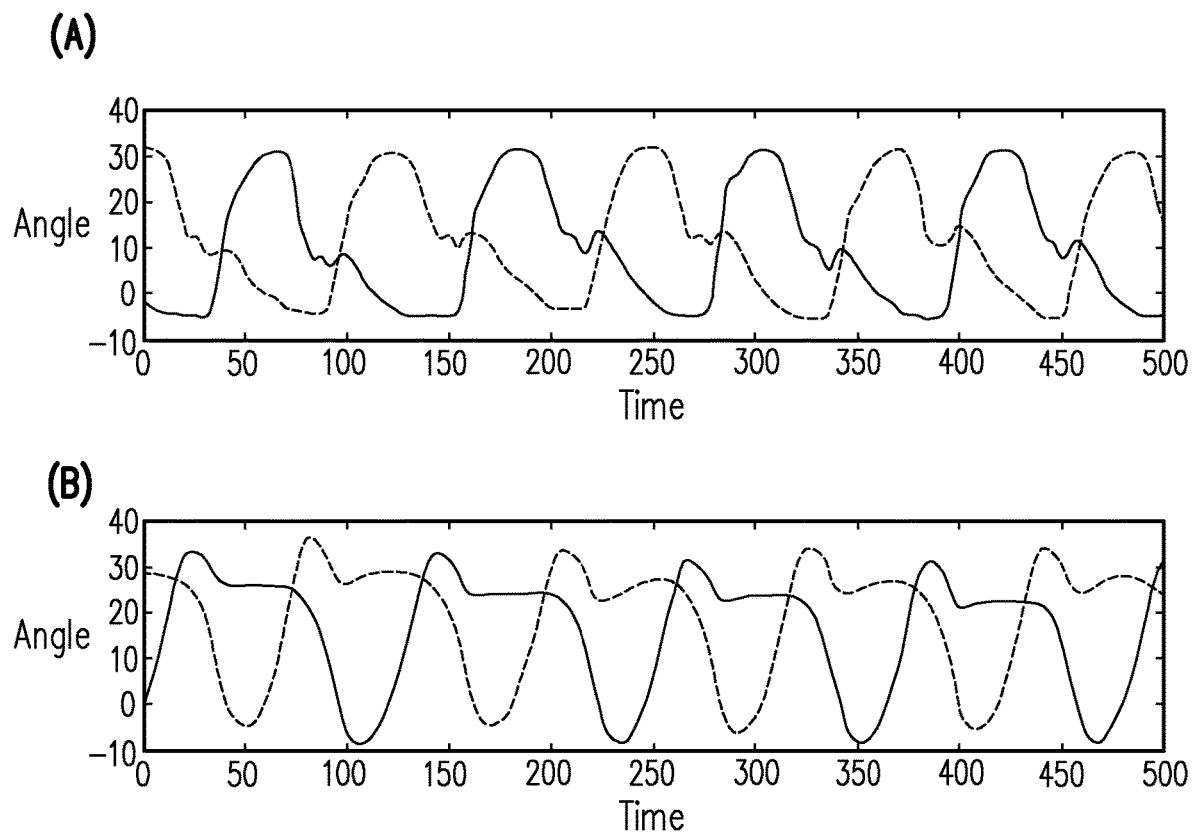
FIG. 4 is a schematic diagram of sampling values of a plurality of angle sensors in a normal walking posture of the user.

FIG. 3 is a flowchart illustrating a control method of a force applying auxiliary device according to an embodiment of the invention. The control method of FIG. 3 is adapted to the force applying auxiliary device 100 of FIG. 1 and FIG. 2. Referring to FIG. 1 and FIG. 3 at the same time, in step S310, the processor 110 collects motion posture data of the user according to the at least one first sensor and the at least one second sensor in the sensor group 120. In detail, FIG. 4 is a schematic diagram of sampling values of a plurality of angle sensors in a normal walking posture of the user. In FIG. 4, the first angle sensors 125 and 127 and the second angle sensors 126 and 128 of the sensor group 120 are applied for implementation. Referring to FIG. 4, a part (A) in FIG. 4 is used to represent sampling values of the first angle sensor 125 and the second angle sensor 126 respectively at the right hip joint and the left hip joint of the user, and a part (B) in FIG. 4 is used to represent sampling values of the first angle sensor 127 and the second angle sensor 128 respectively at the right knee joint and the left knee joint of the user. FIG. 4 shows the sampling values obtained by the angle sensors 125-128 during normal walking of the user. The processor 110 converts these sampling values into information that is easy to perform value comparison (for example, information in a table form), so as to generate the motion posture data.

In step S320, the processor 110 determines whether a motion of the user is unbalanced according to the motion posture data generated in step S310. In detail, the database 140 of FIG. 1 of the embodiment stores a plurality of preset motion posture samples. These preset motion posture samples are data collected under normal circumstances of the user. The processor 110 may interpret and record sensor information of the user in a normal walking mode, and sort the same into preset motion posture sample patterns of the normal walking mode. The processor 110 compares the preset motion posture samples in the database 140 with the motion posture data of the user to determine whether the motion of the user is unbalanced.

In step S330, when it is determined that the motion of the user is unbalanced, the processor 110 selects at least one of a plurality of preset abnormal patterns as a specific abnormal pattern according to the motion posture data, and controls the force applying driver 130 to provide a force by using the specific abnormal pattern. It should be noted that a force difference between a first force applied to a first side foot of the user and a second force applied to a second side foot of the user is adjusted based on a difference between the sampling values of the at least one first sensor and the at least one second sensor.

For example, the processor 110 may obtain parameters available for comparison in the embodiment from the collected sampling values for the usage of step S320, which are, for example, a time length of a sampling time (represented by "t"), an acceleration difference between the left hip joint and the right hip joint within the sampling time (represented by "HipMaxd"), an average angle at the left hip joint within the sampling time (represented by "HipAvgLeft"), an average angle at the right hip joint within the sampling time (represented by "HipAvgRight"), the maximum acceleration value at the left hip joint within the sampling time (represented by "KneeMaxLeft"), and the maximum acceleration value at the right hip joint within the sampling time (represented by "KneeMaxRight").

On the other hand, the processor 110 or the database 140 stores normal values of the preset motion posture samples, where "I" is used to represent the normal values. For example, when the user performs a motion in a normal posture, the acceleration difference between the left hip joint and the right hip joint within the sampling time is 0.5 degrees (i.e., HipMaxd (I)=0.5°), the average angle of the left hip joint within the sampling time is 12.1 degrees (HipAvgLeft (I)=12.10), the average angle of the right hip joint within the sampling time is 9.7 degrees (HipAvgRight (I)=9.7°), the maximum acceleration value at the left hip joint within the sampling time is 6.5 degrees (KneeMaxLeft (I)=6.5°) and the maximum acceleration value at the right hip joint within the sampling time is 12.6 degrees (KneeMaxRight (I)=12.6°).

Therefore, the aforementioned angle information may be used to define difference variables, or referred to as preset abnormal patterns D, D1-D4 of each item. Calculation formulas (1) to (5) corresponding to five preset abnormal patterns and threshold values corresponding to the preset abnormal partners are listed below:

$$D(t)=|\text{HipMax}d(t)-\text{HipMax}d(I)| \quad (1)$$

$$D1(t)=|\text{HipAvgLeft}(t)-\text{HipAvgLeft}(I)| \quad (2)$$

$$D2(t)=|\text{HipAvgGight}(t)-\text{HipAvgGight}(I)| \quad (3)$$

$$D3(t)=|\text{KneeMaxLeft}(t)-\text{KneeMaxLeft}(I)| \quad (4)$$

$$D4(t)=|\text{KneeMaxRight}(t)-\text{KneeMaxRight}(I)| \quad (5)$$

The preset abnormal pattern D of the embodiment is used to determine whether the motion at the left and right hip joints is unbalanced. The processor 110 determines whether the motion of the user is unbalanced mainly according to the preset abnormal mode D (step S320). When a result of the calculation formula (1) is not greater than a preset value DA, the processor 110 determines that the motion of the user is balanced (i.e., the result of step S320 is no), and the method flow proceeds from step S320 to step S322. In step S322, the processor 110 provides a force of a fixed value according to the preset motion posture samples in the aforementioned database 140. Then, the method flow returns from step S322 to step S310 to repeat the steps of the embodiment of the invention. Comparatively, when the result of the calculation formula (1) is greater than the preset value DA, the method flow proceeds from step S320 to step the S330, which represents that the two feet of the user are currently in an unbalanced state. In this way, the processor 110 may determine whether the motion of the user is unbalanced by using the calculation formula (1) and a calculation result of the calculation formula (1) (i.e., a parameter difference D (t)).

In some embodiments, the processor 110 may also determine whether the motion of the user is unbalanced according to the preset motion posture samples (step S320). Namely, when the motion posture data of the user is not complied with any of the preset motion posture samples, it represents that the motion of the user is unbalanced (i.e., the result of step S320 is yes), and the method flow proceeds from step S320 to step S330. When the processor 110 determines that the motion of the user is unbalanced according to the aforementioned calculation formula (1), the processor 110 selects at least one of a plurality of preset abnormal patterns (i.e., the calculation formulas (2)-(5) corresponding to the preset abnormal patterns) according to the results D1(t)-D4(t) of the calculation formulas (2)-(5) and the corresponding threshold values, please refer to step S330 and step S340 for details.

In step S330, the processor 110 selects at least one of the preset abnormal patterns as a specific abnormal pattern according to the motion posture data. Moreover, in step S340, the processor 110 controls the force applying driver 130 to provide a force by using the specific abnormal pattern.

In detail, in the embodiment, when the result D1(t) of the calculation formula (2) is greater than a threshold value D1A, it represents that a foot lifting force of the first side foot (at the left thigh) needs to be increased, so that an abnormal posture sample corresponding to the calculation formula (2) is set as the selected specific abnormal pattern. Therefore, the processor 110 controls the force applying driver 130 to increase the force applied to the first side foot (at the left thigh) of the user, and an increased value thereof is increased as the difference between the result D1(t) and the threshold value D1A is increased.

When the result D2(t) of the calculation formula (3) is greater than a threshold value D2A, it represents that a foot lifting force of the second side foot (at the right thigh) needs to be increased, so that an abnormal posture sample corresponding to the calculation formula (3) is set as the selected specific abnormal pattern. Therefore, the processor 110 controls the force applying driver 130 to increase the force applied to the second side foot (at the right thigh) of the user, and an increased value thereof is increased as the difference between the result D2(t) and the threshold value D2A is increased. When the situations of the calculation formula (2) and the calculation formula (3) occur, it usually represents that the motion of the user is changed from a semi-squat state to a standing state, and the processor 110 controls the force applying driver 130 to increase the foot lifting force of the user at the thigh, thereby assisting the user to lift the thigh.

When the result D3(t) of the calculation formula (4) is greater than a threshold value D3A, it represents that a support force of the first side foot (i.e., at the right knee joint) needs to be increased, so that an abnormal posture sample corresponding to the calculation formula (4) is set as the selected specific abnormal pattern. Therefore, the processor 110 controls the force applying driver 130 to increase the force applied to the first side foot (at the right knee joint) of the user, and an increased value thereof is increased as the difference between the result D3(t) and the threshold value D3A is increased.

When the result D4(t) of the calculation formula (5) is greater than a threshold value D4A, it represents that a support force of the second side foot (at the left knee joint) needs to be increased, so that an abnormal posture sample corresponding to the calculation formula (5) is set as the selected specific abnormal pattern. Therefore, the processor 110 controls the force applying driver 130 to increase the force applied to the second side foot (at the left knee joint) of the user, and an increased value thereof is increased as the difference between the result D4(t) and the threshold value D4A is increased. When the situations of the calculation formula (4) and the calculation formula (5) occur, it usually represents that the motion of the user is changed from the semi-squat state to the standing state, and the processor 110 controls the force applying driver 130 to increase the support force of the user at the calf, thereby assisting the user to stand up or squat slowly.

In step S350, when it is determined that the motion of the user is unbalanced, the processor 110 may also sort the collected motion posture data of the user into abnormal posture samples, and store the abnormal posture samples in the database 140. In this way, the processor 110 may also compare the abnormal posture samples previously stored in the database 140 with the motion posture data of the user in step S320 to quickly and accurately determine whether the motion of the user is unbalanced.

The force applying auxiliary of the force applying driver 130 on the leg of the user is mainly divided into three types: "stop", "foot lifting auxiliary" and "support auxiliary". These three types are judged through three preset angles, which are respectively a stop angle AngStop, a support angle AngSup and a foot lifting angle AngLift.

When an angle between the thigh and the calf is less than or equal to the preset stop angle AngStop, it represents that the user is close to vertical standing and does not move, which is the "stop" at this moment, and the forcing applying driver 130 does not provide any force. When the angle between the thigh and the calf is greater than a half of a sum of the support angle AngSup and the foot lifting angle AngLift, it represents that the user needs a foot lifting force, which is the "foot lifting auxiliary" at this moment, and the force applying driver 130 provides the foot lifting force. When the angle between the thigh and the calf is less than a half of the sum of the support angle AngSup and the foot lifting angle AngLift, it represents that the user needs a support force, which is the "support auxiliary" at this moment, and the force driver 130 provides the support force.

Figure 5:
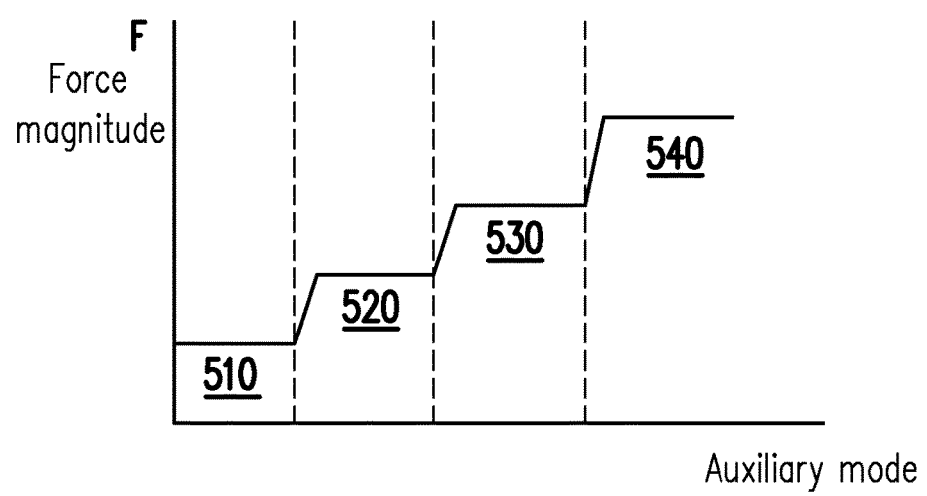
FIG. 5 is a schematic diagram of magnitudes of forces applied by a force applying driver in a force applying auxiliary device.

FIG. 5 is a schematic diagram of magnitudes of forces applied by the force applying driver 130 in the force applying auxiliary device 100. The force applying driver 130 of the embodiment is controlled by the processor 110, and in the embodiment, it is designed to gradually increase a magnitude of the force applied by the force applying driver 130 in a stepped manner, such as auxiliary modes 510-540 shown in FIG. 5. For example, in the auxiliary mode 510, since the force applying auxiliary device 100 still has a basic weight, the force applying driver 130 usually assists in providing a basic force. When the sampling values between the first sensor and the second sensor are significantly different, the processor 110 may automatically increase a level of the auxiliary mode, for example, gradually increase the auxiliary mode 510 to the auxiliary mode 540, so as to gradually increase the applied force.

In summary, the force applying auxiliary device and the control method thereof in the embodiments of the invention may collect the motion posture data of the user through sensors located at different sides, so as to determine whether the motion of the user is abnormal, for example, left and right asymmetry of a walking posture, a situation that the user holds a heavy object on one side, etc., and automatically adjust magnitudes of the forces applied to the two sides by the force applying auxiliary device according to a difference of sampling data of the sensors on the two sides, such that the user may gradually recover a normal motion (for example, postures such as normal walking, squatting, standing, etc.) from motion abnormity through the force applying auxiliary device. In this way, when the user suddenly slows down on one side of footstep during a motion, or it is detected that the user is walking with a heavy object in hand or is performing motions such as standing up, squatting down, etc., a magnitude of the force applied by the force applying driver is adjusted according to a weight of the detected heavy object instead of applying a fixed force, so that the user feels more support and assistance from the force applying auxiliary device on corresponding motions. Moreover, abnormal motion data of the user may be recorded in a database to serve as a reference for subsequent determination of motions of the user.

What is claimed is:

1. A force applying auxiliary device comprising:
a sensor group comprising at least one first sensor and at least one second sensor, wherein the at least one first sensor is disposed on a first side of the force applying auxiliary device, and the at least one second sensor is disposed on a second side of the force applying auxiliary device;
a processor coupled to the sensor group;
a database, comprising a plurality of preset motion posture samples; and
motor sets controlled by the processor,
wherein the processor collects motion posture data of user according to the at least one first sensor and the at least one second sensor, and determines whether a motion of the user is unbalanced according to the motion posture data, and
when determining that the motion of the user is unbalanced, the processor selects at least one of a plurality of preset abnormal patterns as a specific abnormal pattern according to the motion posture data, and controls the motor sets to provide a force by using the specific abnormal pattern, wherein the force is increased by a corresponding preset value,
wherein a force difference between a first force applied to a first side foot of the user and a second force applied to a second side foot of the user is adjusted based on a difference between sampling values of the at least one first sensor and the at least one second sensor,
wherein the processor compares the preset motion posture samples in the database with the motion posture data of the user to determine whether the motion of the user is unbalanced,
wherein the preset motion posture samples are sensor information of the user in a normal walking mode,
wherein when determining that the motion of the user is unbalanced, the processor further sorts the collected motion posture data of the user into abnormal posture samples, and stores the abnormal posture samples in the database,
wherein the processor further compares the abnormal posture samples in the database with the motion posture data of the user to determine whether the motion of the user is unbalanced.

2. The force applying auxiliary device as claimed in claim 1, wherein the first side and the second side are opposite to each other.

3. The force applying auxiliary device as claimed in claim 1, wherein the processor compares a result of calculating the sampling values of the at least one first sensor and the at least one second sensor through a calculation formula corresponding to the preset abnormal pattern with a threshold value corresponding to the preset abnormal pattern, so as to determine whether to select the preset abnormal pattern as the specific abnormal pattern.

4. The force applying auxiliary device as claimed in claim 1, wherein the at least one first sensor or the at least one second sensor comprises:
an acceleration sensor configured to detect an acceleration change at a position where the acceleration sensor is located; and
an angle sensor configured to detect an angle change of a foot at a position where the angle sensor is located.

5. The force applying auxiliary device as claimed in claim 1, wherein the motor sets comprises a first knee motor on the first side and a second knee motor on the second side, and
the force applying auxiliary device further comprises at least one strap, an exoskeleton frame, and at least one protector.

6. A control method of a force applying auxiliary device, wherein the force applying auxiliary device comprises a sensor group, and the sensor group comprises at least one first sensor disposed on a first side of the force applying auxiliary device and at least one second sensor disposed on a second side of the force applying auxiliary device, the control method comprising:
collecting motion posture data of a user according to the at least one first sensor and the at least one second sensor;
determining whether a motion of the user is unbalanced;

when it is determined that the motion of the user is unbalanced, selecting at least one of a plurality of preset abnormal patterns as a specific abnormal pattern according to the motion posture data in response to determining that the motion of the user is unbalanced; and controlling motor sets to provide a force by using the specific abnormal pattern, wherein the force is increased by a corresponding preset value, wherein a force difference between a first force applied to a first side foot of the user and a second force applied to a second side foot of the user is adjusted based on a difference between sampling values of the at least one first sensor and the at least one second sensor, wherein the step of determining whether the motion of the user is unbalanced comprises:

comparing a plurality of preset motion posture samples in a database with the motion posture data of the user to determine whether the motion of the user is unbalanced, wherein the preset motion posture samples are sensor information of the user in a normal walking mode, when it is determined that the motion of the user is unbalanced, sorting the collected motion posture data of the user into abnormal posture samples, and storing the abnormal posture samples in the database, and the step of determining whether the motion of the user is unbalanced further comprises:

comparing the abnormal posture samples in the database with the motion posture data of the user to determine whether the motion of the user is unbalanced.

\* \* \* \* \*